(12) United States Patent
Zhang et al.

(10) Patent No.: US 10,195,833 B2
(45) Date of Patent: Feb. 5, 2019

(54) PRE-COATED BOTTOM COVER COMBINATION MACHINE FOR TILE CARPET

(71) Applicant: Fushun Ma, Jiaxing (CN)

(72) Inventors: Wang Zhang, Jiaxing (CN); Jianjun Hu, Jiaxing (CN); Yanpeng Ma, Jiaxing (CN)

(73) Assignee: Fushun Ma, Jiaxing (CN)

( * ) Notice: Subject to any disclaimer, the term of this patent is extended or adjusted under 35 U.S.C. 154(b) by 174 days.

(21) Appl. No.: 15/460,266

(22) Filed: Mar. 16, 2017

(65) Prior Publication Data

US 2018/0009207 A1   Jan. 11, 2018

(30) Foreign Application Priority Data

Jul. 11, 2016  (CN) .......................... 2016 1 0594220

(51) Int. Cl.
| | |
|---|---|
| *B32B 37/00* | (2006.01) |
| *B32B 39/00* | (2006.01) |
| *D06N 3/00* | (2006.01) |
| *B32B 37/06* | (2006.01) |
| *B32B 37/18* | (2006.01) |
| *D06N 3/10* | (2006.01) |
| *B32B 37/20* | (2006.01) |

(52) U.S. Cl.
CPC .......... *B32B 37/0053* (2013.01); *B32B 37/06* (2013.01); *B32B 37/182* (2013.01); *B32B 37/203* (2013.01); *B32B 39/00* (2013.01); *D06N 3/10* (2013.01); *B32B 2309/02* (2013.01); *B32B 2419/04* (2013.01); *B32B 2471/02* (2013.01); *D06N 2201/0254* (2013.01); *D06N 2201/0263* (2013.01); *D06N 2203/045* (2013.01); *D06N 2211/066* (2013.01); *D10B 2503/04* (2013.01)

(58) Field of Classification Search
CPC ... B32B 37/00; B32B 37/005; B32B 37/0053; B32B 37/06; B32B 37/10; B32B 37/18; B32B 37/18; B32B 37/182; B32B 37/20; B32B 37/20; B32B 37/203; B32B 39/00; D06N 3/00; D06N 3/10
See application file for complete search history.

(56) References Cited

U.S. PATENT DOCUMENTS

| | | | |
|---|---|---|---|
| 9,604,439 B1 * | 3/2017 | Ellis | B32B 37/20 |
| 2002/0119281 A1 * | 8/2002 | Higgins | D06N 7/0086 |
| | | | 428/95 |

(Continued)

*Primary Examiner* — Jacob T Minskey
*Assistant Examiner* — Matthew Hoover
(74) *Attorney, Agent, or Firm* — Hemisphere Law, PLLC; Zhigang Ma (57) ABSTRACT

The present disclosure provides a pre-coated bottom cover combination machine for tile carpet comprising a carpet surface pre-coated processing line and a back bottom cover processing line. The back bottom cover processing line includes drive device for driving the carpet belt to move, black material feeding and automatic control device, scraper, white material feeding and automatic control device, composite device of bottom back and carpet surface, bottom back plasticizing and heating line, embossing device, carpet body water-cooled plate, carpet body water-cooled roller, carpet storage rack, deviation correction device, dicing machine, inspection table. The present invention can meet the requirements of reducing the manufacturing cost of tile carpets.

8 Claims, 5 Drawing Sheets

(56) References Cited

U.S. PATENT DOCUMENTS

2009/0226662 A1* 9/2009 Dyczko-Riglin ........ C08J 3/201
    428/95
2013/0327858 A1* 12/2013 Rees ................... B02C 18/0084
    241/24.1

* cited by examiner

PRE-COATED BOTTOM COVER COMBINATION MACHINE FOR TILE CARPET

TECHNICAL FIELD

The present disclosure relates to a production apparatus for tile carpet, and more particularly, to a pre-coated bottom cover combination machine for tile carpet.

BACKGROUND

Tile carpets are commonly known as "square carpets", which has many advantages: transport, storage, transfer, paving and easy to change; wear-resisting, mute, anti-fouling, good dust absorption effect; and the pavement pattern effect can be easily changed due to random spelling patterns. Tile carpets are widely used in offices, reception rooms, machine rooms and other places. The structure of the tile carpet is made up of the carpet surface on the upper surface and the bottom back underneath, wherein the carpet surface and the bottom back are bonded together. The carpet surface can be produced in such a way: the tufted blank carpet is made by non-woven fabric through tufting, and after being coated with EVA latex on the bottom of the tufted blank carpet (to prevent tufting from falling off, increase the pile pull out force, and play a role in flame retardant), the tufted blank carpet is heated to 155-175° C. and dried in the oven, known as tufted pre-coated carpet surface. Alternatively, it may be produced in this way: non-woven fabric is coated with adhesive and fluff on the non-woven fabric is adsorbed through static adsorption, then the fluff is adhered on the non-woven fabric through heating to make the carpet surface, known as flocking carpet surface. The material of the carpet surface comprises nylon fiber, polypropylene fiber and polyester fiber and so on. Bottom back is usually PVC back material, which is PVC mixture stirred into paste mainly by calcium powder (CaCO3) commonly known as stone powder, Polyvinyl Chloride (PVC), DINP or DOP oil, plasticizer (C24H3804), calcium oxide (Cao) commonly known as lime, viscosity reducer, stabilizer, D-04 glue, etc. The PVC mixture is coated on the upper and lower surfaces of the glass fiber cloth and is compound on the back surface of the pre-coated carpet to make the bottom back. After being heated to 155-190° C. in a special oven, the bottom back is bonded together with the carpet surface by plasticizing, called bottom covering. The bottom back of the carpet of which the bottom cover is plasticized is embossed and cooling finalized, then is fed to a slabbing machine, and the carpet will be cut into a certain size of tile carpet by a cutting machine. The bottom back could also use asphalt material. It is mainly composed of calcium powder (CaCO3), No. 10 asphalt, No. 90 asphalt and polyester non-woven fabrics. This kind of tile carpet with asphalt bottom back is of relatively lower grade and less use. From the above production process, it can be seen that in the production process of the carpet surface, EVA latex or adhesive is required to be fast bonded with the tufted above or fluff and non-woven fabrics by heating to curing and drying, known as pre-coated drying and heating. The process of bottom covering the bottom back and carpet surface also needs to be heated, so that the bottom back is boned together with the carpet surface, known as plasticizing and heating. In general, firstly the blank carpet is coated with EVA latex and dried to make pre-coated carpet surface on the pre-coated processing line of the blank carpet, then after being rolled it is fed into the processing line of bottom cover to be composited with the bottom back to make the finished product of carpet. That is, both of the pre-coated drying and heating operation and the plasticizing and heating operation in the production of carpet are carried out in two separate processing lines.

SUMMARY

One of the objects of the present invention is to provide a pre-coated bottom cover combination machine for tile carpet with advantages of: good continuity in pre-coating and bottom covering process, energy recycling in heating and drying, compact structure, labor saving, shortening the time of carpet surface pre-coating and back bottom covering, reducing area of workshop occupied by pre-coating line and bottom covering line, significantly reducing the manufacturing cost of tile carpets.

In order to achieve the above requirements, the present invention is achieved by the following technical solutions:

The exemplary pre-coated bottom cover combination machine for tile carpet includes a carpet surface pre-coated processing line and a back bottom cover processing line according to the present disclosure. The carpet surface pre-coated processing line includes a blank carpet reel device, a blank carpet storage rack, an antifouling gluing device, a pre-coated drying and heating line, a pre-coated carpet storage rack, an U-type carpet storage box in sequence according to a blank carpet pre-coated processing order, and then it is fed into a composite device of bottom back and carpet surface in the back bottom cover processing line for bottom cover processing. The back bottom cover processing line includes a drive device for driving the carpet belt to move, a black material feeding and automatic control device, a scraper, a white material feeding and automatic control device, a composite device of bottom back and carpet surface, a bottom back plasticizing and heating line, an embossing device, a carpet body water-cooled plate, a carpet body water-cooled roller, a carpet storage rack, a deviation correction device, a dicing machine, and an inspection table. The carpet surface pre-coated processing line is located above the back bottom cover processing line. The pre-coated drying and heating line in the carpet surface pre-coated processing line and the bottom back plasticizing and heating line in the back bottom cover processing line are performed in the same heating oven, wherein the upper layer of the heating oven is pre-coated drying and heating line, and the bottom of the pre-coated drying and heating line is the bottom back plasticizing and heating line.

Preferably, a metal thermal conductive plate or a mesh with through-hole is used to separate between the pre-coated drying and heating line and the bottom back plasticizing and heating line, to prevent staple fibers and other scrap rubber on the carpet surface which is in the process of pre-coated drying and heating from falling into the carpet surface which is in the process of plasticizing.

Preferably, the pre-coated drying and heating line is heated using a natural gas burner, and the pre-coated dried carpet surface is heated up via a heating fan air duct.

Preferably, the bottom surface of the bottom back which is bottom covered is moved linearly above of the metal heating plate to generate heat in the bottom back plasticizing and heating line.

Preferably, the metal heating plate is a reciprocating oil groove on the plate, forming an in/out pipe, into which hot oil of 165° C. to 185° C. is injected.

Preferably, the heating oven is made up of a plurality of single ovens in series.

Preferably, three to five dehumidifier air fans are provided in the heating oven and water vapor in the heating oven is withdrawn to the outside.

Preferably, a pre-coated carpet roll device is disposed at the back of the U-type carpet storage box and is used in the carpet surface pre-coated processing line for completing the process that the pre-coated dried carpet surface is led to the pre-coated carpet roll device through a guide roller and is rolled directly to a barrel shape for later use, and an unwinding device is disposed between the pre-coated carpet roll device and the U-type carpet storage box.

Figure 1:
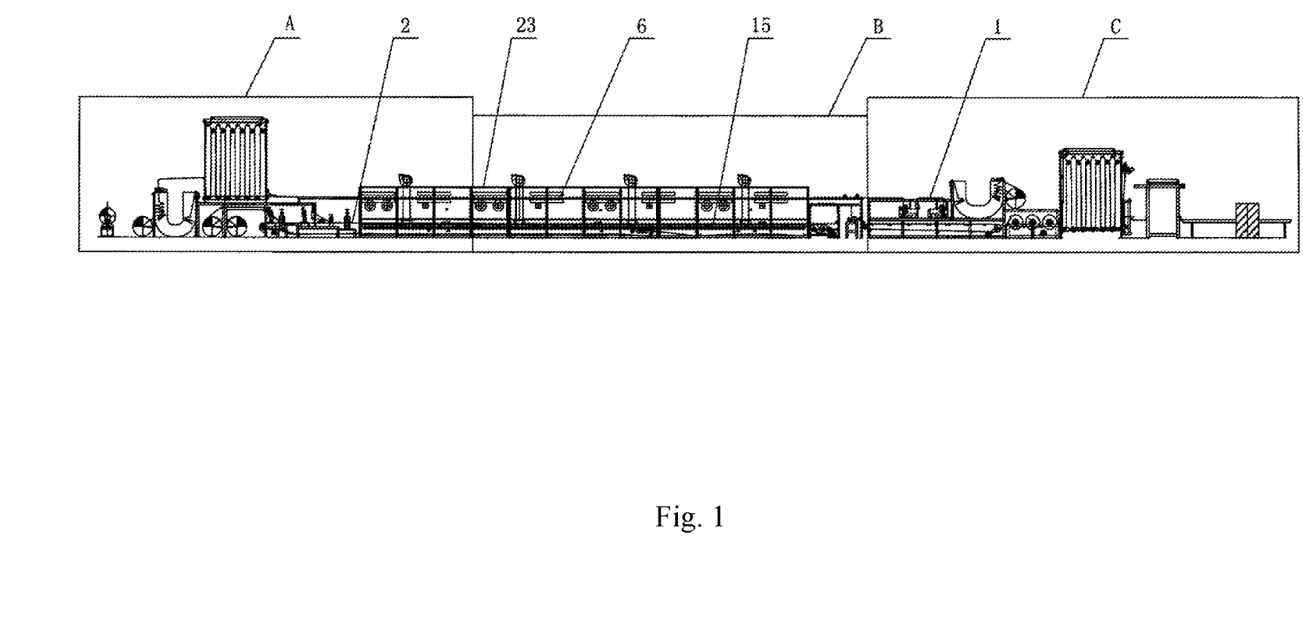
FIG. 1 is a schematic diagram of a pre-coated bottom cover combination machine of tile carpet, which is directly passed into the bottom cover processing line from carpet surface completed in the pre-coated processing line according to the present disclosure.

According to the above embodiments of the pre-coated bottom cover combination machine for tile carpet, the pre-coated drying and heating line in the carpet surface pre-coated processing line and the bottom back plasticizing and heating line in the back bottom cover processing line are performed in the same heating oven, so that the remaining heat in the respective heating processes can be utilized by each other. The working temperature on the upper level is lower than that on the lower level, and residual heat after the bottom back on the lower level being plasticized and heated rises to supplement for the upper pre-coated drying and heating. According to the theoretical measurement, its thermal energy saves about ⅓ than that of the two lines being heated alone respectively. In addition, due to the fact that the pre-coated processing line is imposed above the back bottom cover processing line, the length of processing line is shortened by about 50 meters, which is 42.7% shorter than the overall length of the original independent processing line (117 meters), the areas of workshop occupied by the processing equipments is reduced, and the manufacturing cost of tile carpets as well as bottom cover processing line is reduced. On the use of labor, four less people are required by using this combination machine than that by using original pre-coated line and the bottom cover line. It also eliminates the waste of carpet surface joints and labor use, since it avoids the original process that the processed carpet surface is rolled first and then the rolled carpet surface is moved to bottom cover processing line for joint and bottom cover processing. In use, the technical solutions of the present invention can be as follows according to the needs of production orders such as product material, color varieties and other flexible use:

1. Carpet surface pre-coated processing line and back bottom cover processing line are enabled at the same time, and the carpet surface completed in the carpet surface pre-coated processing line is transferred directly into the back bottom cover processing line. The tile carpet for bottom cover processing is shown in FIG. 1, pre-coated drying and heating line and bottom back plasticizing and heating line are enabled at the same time, and the heat in both of the heating lines can be recycled.

Figure 2:
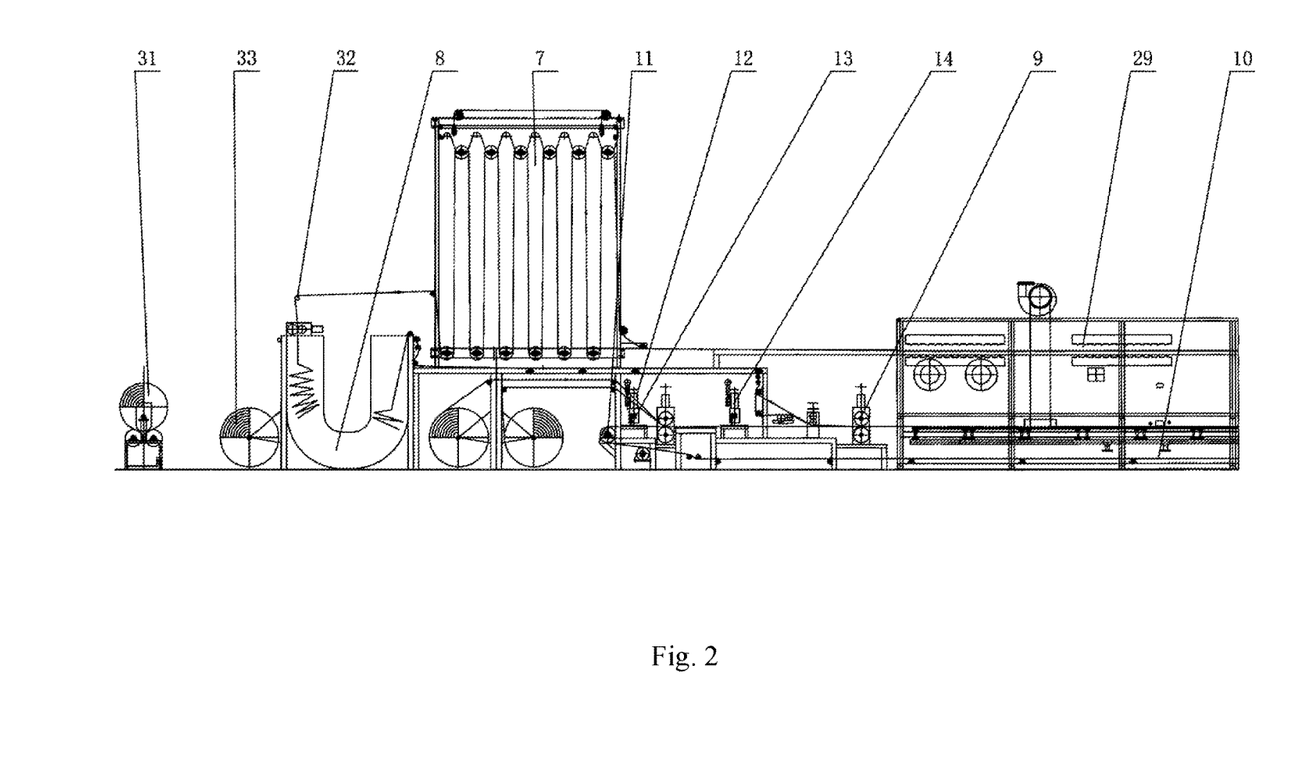
FIG. 2 is a partial enlarged view of area A in FIG. 1 according to the present disclosure.
Figure 3:
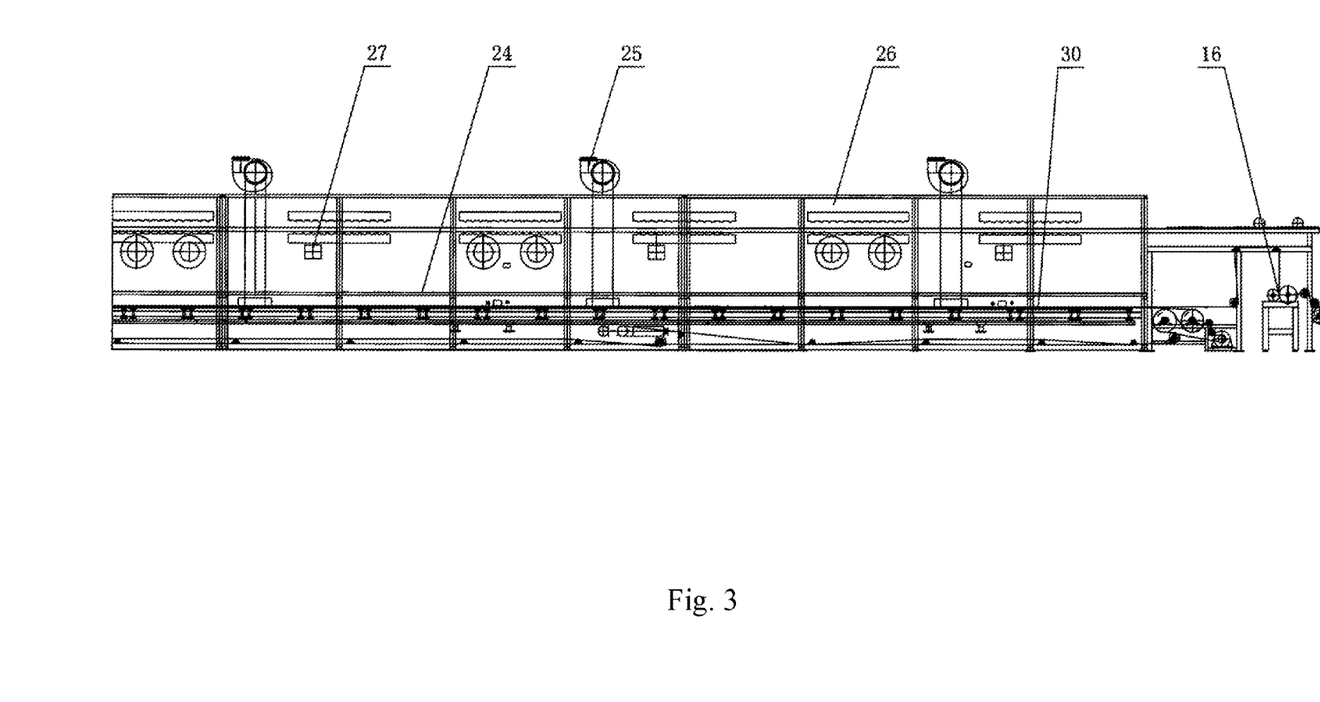
FIG. 3 is a partial enlarged view of area B in FIG. 1 according to the present disclosure.
Figure 4:
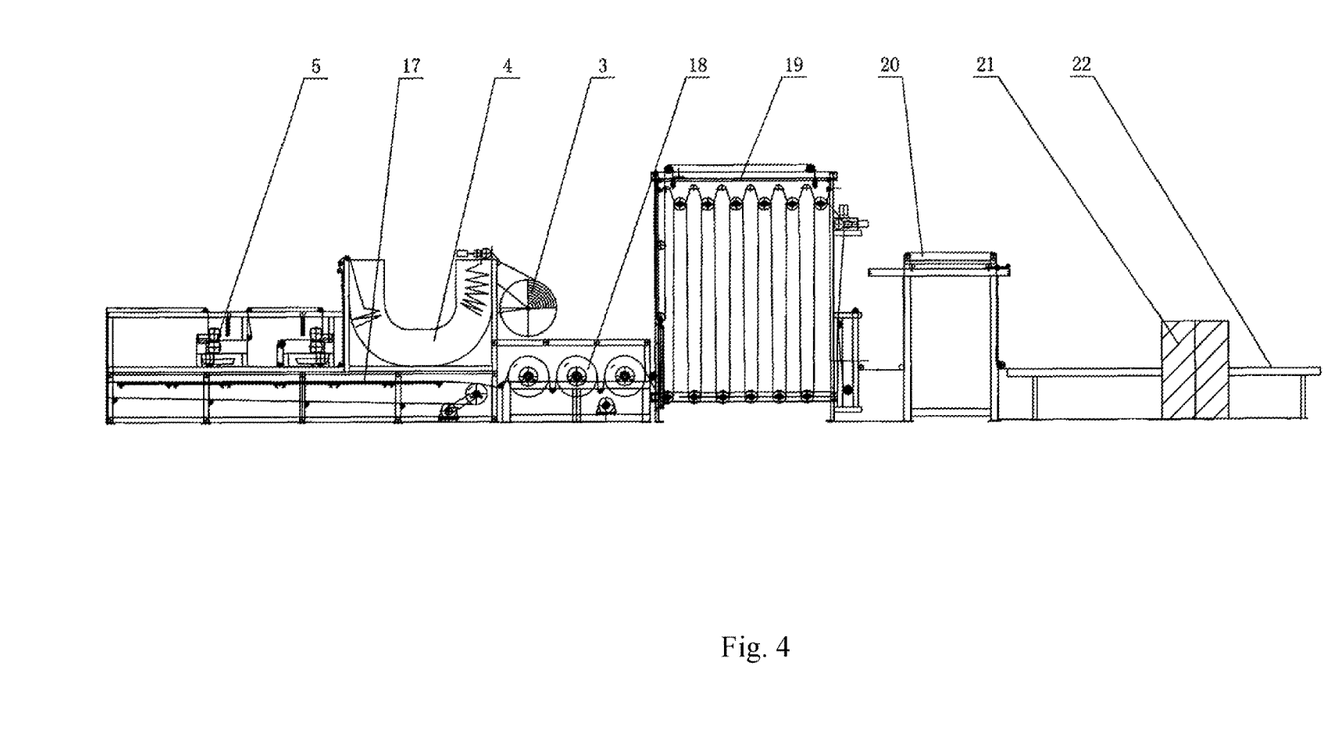
FIG. 4 is a partial enlarged view of area C in FIG. 1 according to the present disclosure.

2. Carpet surface pre-coated processing line and back bottom cover processing line are enabled at the same time, and the carpet surface completed in the carpet surface pre-coated processing line is not transferred directly into the back bottom cover processing line. However, the pre-coated carpet surface completed in the carpet surface pre-coated processing line is rolled directly into a barrel shape for later use. The bottom cover processing line utilizes other carpet surfaces that have been pre-coated for bottom cover process, rather than using the pre-coated carpet surface being processed in the carpet surface pre-coated processing line, as shown in FIG. 2. The pre-coated drying and heating line and bottom back plasticizing and heating line are enabled at the same time, and the heat in both of the heating lines can be recycled.

3. Carpet pre-coated processing line works independently, and only the pre-coated drying and heating line is enabled. The completed carpet surface is rolled directly into a barrel shape for later use. The back bottom cover processing line is shut down, and the bottom back plasticizing and heating line is not enabled, so there is no mutual use of heat.

4. Carpet pre-coated processing line is shut down, and the pre-coated drying and heating line is not enabled. The back bottom cover processing line works independently, and only the bottom back plasticizing and heating line is enabled, so there is no mutual use of heat.

In the Figures: 1. carpet surface pre-coated processing line; 2. back bottom cover processing line; 3. blank carpet reel device; 4. blank carpet storage rack; 5. antifouling gluing device; 6. pre-coated drying and heating line; 7. pre-coated carpet storage rack; 8. U-type carpet storage box; 9. composite device of bottom back and carpet surface; 10. carpet belt; 11. drive device; 12. black material feeding and automatic control device; 13. scraper; 14. white material feeding and automatic control device; 15. bottom back plasticizing and heating line; 16. embossing device; 17. carpet body water-cooled plate; 18. carpet body water-cooled roller; 19. carpet storage rack; 20. deviation correction device; 21. dicing machine; 22. inspection table; 23. heating oven; 24. metal thermal conductive plate or mesh with through-hole; 25. dehumidifier air fan; 26. single oven; 27. natural gas burner; 28. pre-coated dried carpet surface; 29. heating fan air duct; 30. metal heating plate; 31. pre-coated carpet roll device; 32. guide roller; 33. unwinding device.

DETAILED DESCRIPTION

Next, a detailed explanation will be given for exemplary embodiments with reference to the drawings. In the following description of the drawings, a same or like reference sign is given to a same or like part. The drawings schematically represent configurations according to the exemplary embodiments of the present invention. Furthermore, the exemplary embodiments of the present invention described below are examples and may be modified as appropriate as long as the nature of the present invention is not altered.

FIGS. 1-4 are schematic diagrams of a pre-coated bottom cover combination machine for tile carpet according to preferred embodiments of the present disclosure. The exemplary pre-coated bottom cover combination machine for tile carpet includes a carpet surface pre-coated processing line 1 and a back bottom cover processing line 2 according to the present disclosure. The carpet surface pre-coated processing line 1 includes blank carpet reel device 3, blank carpet storage rack 4, antifouling gluing device 5, pre-coated drying and heating line 6, pre-coated carpet storage rack 7, U-type carpet storage box 8 in sequence according to the blank carpet pre-coated processing order, and then it is fed into the composite device of bottom back and carpet surface 9 in the back bottom cover processing line 2 for bottom cover processing. The back bottom cover processing line 2 includes drive device 11 for driving the carpet belt 10 to move, black material feeding and automatic control device 12, scraper 13, white material feeding and automatic control device 14, composite device of bottom back and carpet surface 9, bottom back plasticizing and heating line 15, embossing device 16, carpet body water-cooled plate 17, carpet body water-cooled roller 18, carpet storage rack 19, deviation correction device 20, dicing machine 21, inspection table 22. The carpet surface pre-coated processing line 1 is located above the back bottom cover processing line 2. The pre-coated drying and heating line 6 in the carpet surface pre-coated processing line 1 and the bottom back plasticizing and heating line 15 in the back bottom cover processing line 2 are performed in the same heating oven 23, wherein the upper layer of the heating oven 23 is pre-coated drying and heating line 6, and the bottom of the pre-coated drying and heating line 6 is bottom back plasticizing and heating line 15. Metal thermal conductive plate or mesh with through-hole 24, such as aluminum plate and steel mesh etc, is used to separate between the pre-coated drying and heating line 6 and the bottom back plasticizing and heating line 15, in order to prevent staple fibers and other scrap rubber on the surface of carpet which is in the process of pre-coated drying and heating from falling onto the carpet surface which is in the process of plasticizing. Three to five dehumidifier air fans 25 are provided in the heating oven 23 and the water vapor in the heating oven 23 is withdrawn to the outside. The heating oven 23 consists of a plurality of single ovens 26 in series. The pre-coated drying and heating line 6 is heated using the natural gas burner 27, and the pre-coated dried carpet surface 28 is heated up via the heating fan air duct 29.

Figure 5:
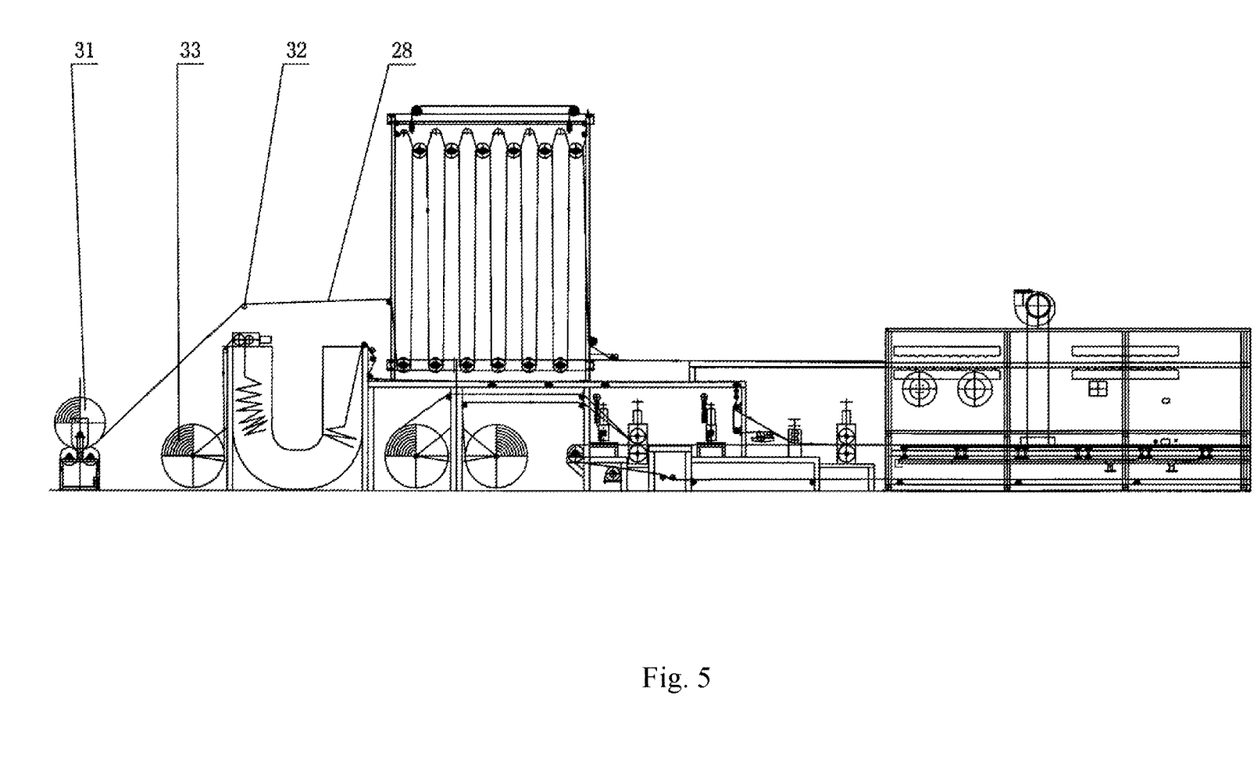
FIG. 5 is the working state diagram that carpet surface completed in the pre-coated line in FIG. 4 is directly rolled into a barrel-shape, and back bottom cover processing line uses other pre-coated dried carpet surface according to the present disclosure.

The bottom surface of the bottom back which is bottom covered is moved linearly above the metal heating plate 30 to generate heat in the bottom back plasticizing and heating line 15. The metal heating plate 30 is a reciprocating oil groove on the plate, forming an in/out pipe, into which hot oil of 165° C. to 185° C. is injected. Furthermore, the pre-coated carpet roll device 31 could be disposed at the back of the U-type carpet storage box 8 and be used in the carpet surface pre-coated processing line 1 for completing the process that the pre-coated dried carpet surface 28 is led to the pre-coated carpet roll device 31 through guide roller 32 and is rolled directly to a barrel shape for later use. An unwinding device 33 of the pre-coated roll carpet is disposed between the pre-coated carpet roll device 31 and U-type carpet storage box 8. The back bottom cover processing line 2 utilizes other carpet surfaces that have been pre-coated for bottom cover process, rather than using the pre-coated dried carpet surface 28 that is being processed on the carpet surface pre-coated processing line 1, as shown in FIG. 5.

According to the above embodiments of the pre-coated bottom cover combination machine for tile carpet, the pre-coated drying and heating line in the carpet surface pre-coated processing line and the bottom back plasticizing and heating line in the back bottom cover processing line are performed in the same heating oven, so that the remaining heat in the respective heating processes can be utilized by each other. The working temperature on the upper level is lower than that on the lower level, and residual heat after the bottom back on the lower level being plasticized and heated rises to supplement for the upper pre-coated drying and heating. According to the theoretical measurement, its thermal energy saves about ⅓ than that of the two lines being heated alone respectively. In addition, due to the fact that the pre-coated processing line is imposed above the back bottom cover processing line, the length of processing line is shortened by about 50 meters, which is 42.7% shorter than the overall length of the original independent processing line (117 meters), the areas of workshop occupied by the processing equipments is reduced, and the manufacturing cost of tile carpets as well as bottom cover processing line is reduced. On the use of labor, four less people are required by using this combination machine than that by using original pre-coated line and the bottom cover line. It also eliminates the waste of carpet surface joints and labor use, since it avoids the original process that the processed carpet surface is rolled first and then the rolled carpet surface is moved to bottom cover processing line for joint and bottom cover processing. In use, the technical solutions of the present invention can be as follows according to the needs of production orders such as product material, color varieties and other flexible use:

1. Carpet surface pre-coated processing line and back bottom cover processing line are enabled at the same time, and the carpet surface completed in the carpet surface pre-coated processing line is transferred directly into the back bottom cover processing line. The tile carpet for bottom cover processing is shown in FIG. 1, pre-coated drying and heating line and bottom back plasticizing and heating line are enabled at the same time, and the heat in both of the heating lines can be recycled.

2. Carpet surface pre-coated processing line and back bottom cover processing line are enabled at the same time, and the carpet surface completed in the carpet surface pre-coated processing line is not transferred directly into the back bottom cover processing line. However, the pre-coated carpet surface completed in the carpet surface pre-coated processing line is rolled directly into a barrel shape for later use. The bottom cover processing line utilizes other carpet surfaces that have been pre-coated for bottom cover process, rather than using the pre-coated carpet surface being processed in the carpet surface pre-coated processing line, as shown in FIG. 2. The pre-coated drying and heating line and bottom back plasticizing and heating line are enabled at the same time, and the heat in both of the heating lines can be recycled.

3. Carpet pre-coated processing line works independently, and only the pre-coated drying and heating line is enabled. The completed carpet surface is rolled directly into a barrel shape for later use. The back bottom cover processing line is shut down, and the bottom back plasticizing and heating line is not enabled, so there is no mutual use of heat.

4. Carpet pre-coated processing line is shut down, and the pre-coated drying and heating line is not enabled. The back bottom cover processing line works independently, and only the bottom back plasticizing and heating line is enabled, so there is no mutual use of heat.

The present invention can meet the requirements of: good continuity in pre-coating and bottom covering process, energy recycling in heating and drying, compact structure, labor saving, shortening the time of carpet surface pre-coating and back bottom covering, reducing area of workshop occupied by pre-coating line and bottom covering line, significantly reducing the manufacturing cost of tile carpets.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A pre-coated bottom cover combination machine for tile carpet comprising a carpet surface pre-coated processing line and a back bottom cover processing line, wherein
the carpet surface pre-coated processing line comprises a blank carpet reel device, a blank carpet storage rack, an antifouling gluing device, a pre-coated drying and heating line, a pre-coated carpet storage rack, an U-type carpet storage box in sequence according to a blank carpet pre-coated processing order, and then it is fed into a composite device of bottom back and carpet surface in the back bottom cover processing line for bottom cover processing;
the back bottom cover processing line comprises a drive device for driving the carpet belt to move, a black material feeding and automatic control device, a scraper, a white material feeding and automatic control device, the composite device of bottom back and carpet surface, a bottom back plasticizing and heating line, an embossing device, a carpet body water-cooled plate, a carpet body water-cooled roller, a carpet storage rack, a deviation correction device, a dicing machine, and an inspection table; and
the carpet surface pre-coated processing line is located above the back bottom cover processing line; the pre-coated drying and heating line in the carpet surface pre-coated processing line and the bottom back plasticizing and heating line in the back bottom cover processing line are performed in the same heating oven, wherein the upper layer of the heating oven is the pre-coated drying and heating line, and the bottom of the pre-coated drying and heating line is the bottom back plasticizing and heating line.

2. The pre-coated bottom cover combination machine for tile carpet according to claim 1, wherein a metal thermal conductive plate or a mesh with through-hole is used to separate between the pre-coated drying and heating line and the bottom back plasticizing and heating line, to prevent staple fibers and other scrap rubber on the carpet surface which is in the process of pre-coated drying and heating from falling into the carpet surface which is in the process of plasticizing.

3. The pre-coated bottom cover combination machine for tile carpet according to claim 1, wherein the pre-coated drying and heating line is heated using a natural gas burner, and the pre-coated dried carpet surface is heated up via a heating fan air duct.

4. The pre-coated bottom cover combination machine for tile carpet according to claim 1, wherein the bottom surface of the bottom back which is bottom covered is moved linearly above of the metal heating plate to generate heat in the bottom back plasticizing and heating line.

5. The pre-coated bottom cover combination machine for tile carpet according to claim 4, wherein the metal heating plate is a reciprocating oil groove on the plate, forming an in/out pipe, into which hot oil of 165° C. to 185° C. is injected.

6. The pre-coated bottom cover combination machine for tile carpet according to claim 1, wherein the heating oven is made up of a plurality of single ovens in series.

7. The pre-coated bottom cover combination machine for tile carpet according to claim 1, wherein three to five dehumidifier air fans are provided in the heating oven and water vapor in the heating oven is withdrawn to the outside.

8. The pre-coated bottom cover combination machine for tile carpet according to claim 1, wherein a pre-coated carpet roll device is disposed at the back of the U-type carpet storage box and is used in the carpet surface pre-coated processing line for completing the process that the pre-coated dried carpet surface is led to the pre-coated carpet roll device through a guide roller and is rolled directly to a barrel shape for later use, and an unwinding device is disposed between the pre-coated carpet roll device and the U-type carpet storage box.

* * * * *